(12) United States Patent
Nazarpoor

(10) Patent No.: US 9,216,383 B2
(45) Date of Patent: Dec. 22, 2015

(54) SYSTEM AND METHOD FOR TWO AND THREE WAY ZPGM CATALYST

(71) Applicant: Zahra Nazarpoor, Camarillo, CA (US)

(72) Inventor: Zahra Nazarpoor, Camarillo, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 141 days.

(21) Appl. No.: 13/849,237

(22) Filed: Mar. 22, 2013

(65) Prior Publication Data

US 2014/0271392 A1 Sep. 18, 2014

Related U.S. Application Data

(60) Provisional application No. 61/791,963, filed on Mar. 15, 2013.

(51) Int. Cl.
*B01D 50/00* (2006.01)
*B01D 53/94* (2006.01)
*B01J 37/02* (2006.01)
(Continued)

(52) U.S. Cl.
CPC .............. *B01D 53/945* (2013.01); *B01J 23/002* (2013.01); *B01J 23/005* (2013.01); *B01J 23/83* (2013.01); *B01J 23/835* (2013.01); *B01J 23/8474* (2013.01); *B01J 35/002* (2013.01); *B01J 37/0219* (2013.01); *B01J 37/0242* (2013.01); *B01J 37/0244* (2013.01); *B01J 37/0248* (2013.01); *B01J 37/035* (2013.01); *B01J 37/038* (2013.01); *B01D 2255/209* (2013.01); *B01D 2255/2045* (2013.01); *B01D 2255/2065* (2013.01); *B01D 2255/2092* (2013.01); *B01D 2255/2094* (2013.01); *B01D 2255/20715* (2013.01); *B01D 2255/20761* (2013.01); *B01D 2255/407* (2013.01); *B01D 2255/908* (2013.01); *B01D 2255/9207* (2013.01); *B01J 2523/00* (2013.01)

(58) Field of Classification Search
CPC ............... B01D 53/94; B01D 53/9404; B01D 53/9409; B01D 53/9413
USPC .................................................. 422/177, 180
See application file for complete search history.

(56) References Cited

U.S. PATENT DOCUMENTS 3,284,370 A 11/1966 Alan et al.
4,062,810 A 12/1977 Vogt et al.
(Continued)

FOREIGN PATENT DOCUMENTS

CH 644637 A5 8/1984
CN 102172527 9/2011
(Continued)

OTHER PUBLICATIONS

K. S. Abdel Halim et al. "Catalytic Oxidation of CO Gas over Nanocrystallite $CuxMn_{1-x}Fe_2O_4$", Feb. 26, 2008, Top Catalyst (2008) 47:66-72.
(Continued)

*Primary Examiner* — Tom P Duong
(74) *Attorney, Agent, or Firm* — Barnes & Thornburg LLP; Edward F. Behm, Jr.; Thomas J. McWilliams

(57) ABSTRACT

Disclosed here are material formulations of use in the conversion of exhaust gases, where the formulations may include Copper (Cu), Cerium (Ce), Tin (Sn), Niobium (Nb), Zirconium (Zr), Calcium (Ca) and combinations thereof.

16 Claims, 12 Drawing Sheets

(51) Int. Cl.
   *B01J 37/03*    (2006.01)
   *B01J 23/00*    (2006.01)
   *B01J 23/83*    (2006.01)
   *B01J 23/835*   (2006.01)
   *B01J 23/847*   (2006.01)
   *B01J 35/00*    (2006.01)

(56) References Cited

U.S. PATENT DOCUMENTS

| | | |
|---|---|---|
| 4,274,981 A | 6/1981 | Suzuki et al. |
| 4,297,150 A | 10/1981 | Sims et al. |
| 4,414,023 A | 11/1983 | Aggen et al. |
| 4,661,329 A | 4/1987 | Suzuki et al. |
| 4,673,556 A | 6/1987 | McCabe et al. |
| 4,797,329 A | 1/1989 | Kilbane et al. |
| 4,885,269 A | 12/1989 | Cyron |
| 5,063,193 A | 11/1991 | Bedford et al. |
| 5,162,284 A | 11/1992 | Soled et al. |
| 5,238,898 A | 8/1993 | Han et al. |
| 5,364,517 A | 11/1994 | Dieckmann et al. |
| 5,371,056 A | 12/1994 | Leyrer et al. |
| 5,580,553 A | 12/1996 | Nakajima |
| 5,658,543 A | 8/1997 | Yoshida et al. |
| 5,747,410 A | 5/1998 | Muramatsu et al. |
| 6,129,834 A | 10/2000 | Peters et al. |
| 6,395,244 B1 | 5/2002 | Hartweg et al. |
| 6,576,587 B2 | 6/2003 | Labarge et al. |
| 6,624,113 B2 | 9/2003 | Labarge et al. |
| 6,696,389 B1 | 2/2004 | Boegner et al. |
| 6,774,080 B2 | 8/2004 | LaBarge et al. |
| 6,938,411 B2 | 9/2005 | Hoffmann et al. |
| 7,129,194 B2 | 10/2006 | Baca et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,803,338 B2 | 9/2010 | Socha et al. |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,845,987 B1 | 9/2014 | Nazarpoor et al. |
| 8,853,121 B1 | 10/2014 | Nazarpoor et al. |
| 8,858,903 B2 | 10/2014 | Nazarpoor |
| 8,969,228 B2 | 3/2015 | Nazarpoor et al. |
| 2002/0042341 A1 | 4/2002 | Golden |
| 2003/0092566 A1 | 5/2003 | Inoue et al. |
| 2004/0151647 A1 | 8/2004 | Wanninger et al. |
| 2006/0120936 A1 | 6/2006 | Alive et al. |
| 2006/0292342 A1 | 12/2006 | Ohno et al. |
| 2008/0125308 A1 | 5/2008 | Fujdala et al. |
| 2009/0220697 A1 | 9/2009 | Addiego |
| 2009/0274903 A1 | 11/2009 | Addiego |
| 2009/0324468 A1 | 12/2009 | Golden et al. |
| 2009/0324469 A1 | 12/2009 | Golden et al. |
| 2009/0324470 A1 | 12/2009 | Alamdari et al. |
| 2010/0062293 A1 | 3/2010 | Triantafyllopoulous et al. |
| 2010/0081563 A1 | 4/2010 | Edgar-Beltran et al. |
| 2010/0152032 A1 | 6/2010 | Galligan |
| 2010/0168449 A1 | 7/2010 | Grey et al. |
| 2010/0184590 A1 | 7/2010 | Althofer et al. |
| 2010/0240525 A1 | 9/2010 | Golden et al. |
| 2010/0266473 A1 | 10/2010 | Chen et al. |
| 2010/0293929 A1 | 11/2010 | Zhan et al. |
| 2012/0015801 A1 | 1/2012 | Deprez et al. |
| 2013/0115144 A1 | 5/2013 | Golden et al. |
| 2013/0172177 A1 | 7/2013 | Domke et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0274662 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0301909 A1 | 10/2014 | Nazarpoor |
| 2014/0301931 A1 | 10/2014 | Nazarpoor |
| 2014/0302983 A1 | 10/2014 | Nazarpoor |
| 2014/0334989 A1 | 11/2014 | Nazarpoor et al. |
| 2014/0334990 A1 | 11/2014 | Nazarpoor |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2015/0005157 A1 | 1/2015 | Nazarpoor et al. |
| 2015/0005158 A1 | 1/2015 | Nazarpoor et al. |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |

FOREIGN PATENT DOCUMENTS

| | | |
|---|---|---|
| EP | 0022349 | 1/1981 |
| EP | 0450987 | 10/1991 |
| EP | 0605142 | 7/1994 |
| EP | 1 256 382 | 11/2002 |
| JP | 62-20613 | 1/1987 |
| JP | 4-215853 | 8/1992 |
| WO | WO 2013004814 | 1/2013 |
| WO | WO 2013068243 | 5/2013 |
| WO | WO 2013121112 | 8/2013 |
| WO | WO 2013153081 | 10/2013 |

OTHER PUBLICATIONS

D. Panayotov, "Interaction Between NO, CO and 02 on gamma-AL203-Supported Copper-Manganese Oxides", 1996, React.Kinet. Catal.Lett. vol. 58, No. 1, 73-78.

Tanaka et al., "Influence of preparation method and additive for Cu-Mn spinel oxide catalyst on water gas shift reaction of reformed fuels", Applied Catalysis A: General 279 (2005) 59-66.

Papavasilious et al., "Combined Steam reforming of methanol over Cu-Mn spinel oxide catalysts", Journal of Catalysis 251 (2007) 7-20.

Mestres et al., Phase Diagram at Low Temperature of the System Zr02/Nb205, Z.Znorg. Alig. Chem., 2001, 627, 294-298.

Non-Final Office Action for U.S. Appl. No. 13/849,169 issued Mar. 6, 2014.

Hayes et al., "Introduction to Catalytic Combustion", pp. 310-313, 1997 OPA (Overseas Publishers Association).

SYSTEM AND METHOD FOR TWO AND THREE WAY ZPGM CATALYST

CROSS-REFERENCE TO RELATED APPLICATIONS

This application claims priority to U.S. Provisional Application No. 61/791,963, entitled System and Method for Two Way ZPGM Oxidation Catalyst Systems, filed Mar. 15, 2013.

BACKGROUND

1. Technical Field

This disclosure relates generally to catalytic converters, and, more particularly, to materials of use in catalyst systems.

2. Background Information

Emissions standards seek the reduction of a variety of materials in exhaust gases, including unburned hydrocarbons (HC), carbon monoxide (CO), and nitrogen oxides (NO). In order to meet such standards, catalyst systems able to convert such materials present in the exhaust of any number of mechanisms are needed.

To this end, there is a continuing need to provide materials able to perform in a variety of environments, which may vary in a number ways, including oxygen content and the temperature of the gases undergoing treatment.

SUMMARY

Two way and three way ZPGM catalyst systems are disclosed. ZPGM catalyst systems may oxidize toxic gases, such as carbon monoxide and hydrocarbons; optionally some ZPGM catalytic converters may as well reduce nitrogen oxides that may be included in exhaust gases. ZPGM catalyst converters may include: a substrate, a washcoat, and an overcoat. Washcoat and overcoat may include at least one ZPGM catalyst, carrier material oxides, and optionally may include OSMs. Suitable known in the art chemical techniques, deposition methods and treatment systems may be employed in order to form the disclosed ZPGM catalyst converters.

Materials suitable for use as catalyst include Copper (Cu), Cerium (Ce), Tin (Sn), Niobium (Nb), Zirconium (Zr), Calcium (Ca) and combinations thereof. Combinations that may be suitable for use as TWCs at temperatures above 200° C. may include Cu—Ce, Cu—Ce—Sn, Cu—Ce—Nb—Zr, and Cu—Ce—Ca.

Support materials of use in catalysts containing one or more of the aforementioned combinations may include Cerium Oxide, Alumina, Titanium Oxide, Zirconia, and Ceria/Zirconia (CZO). Suitable materials for use as substrates may include refractive materials, ceramic materials, metallic alloys, foams, microporous materials, zeolites, cordierites, or combinations.

Numerous other aspects, features and advantages of the present disclosure may be made apparent from the following detailed description, taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the invention. In the figures, any reference numerals designate corresponding parts throughout different views.

DETAILED DESCRIPTION

Figure 1:
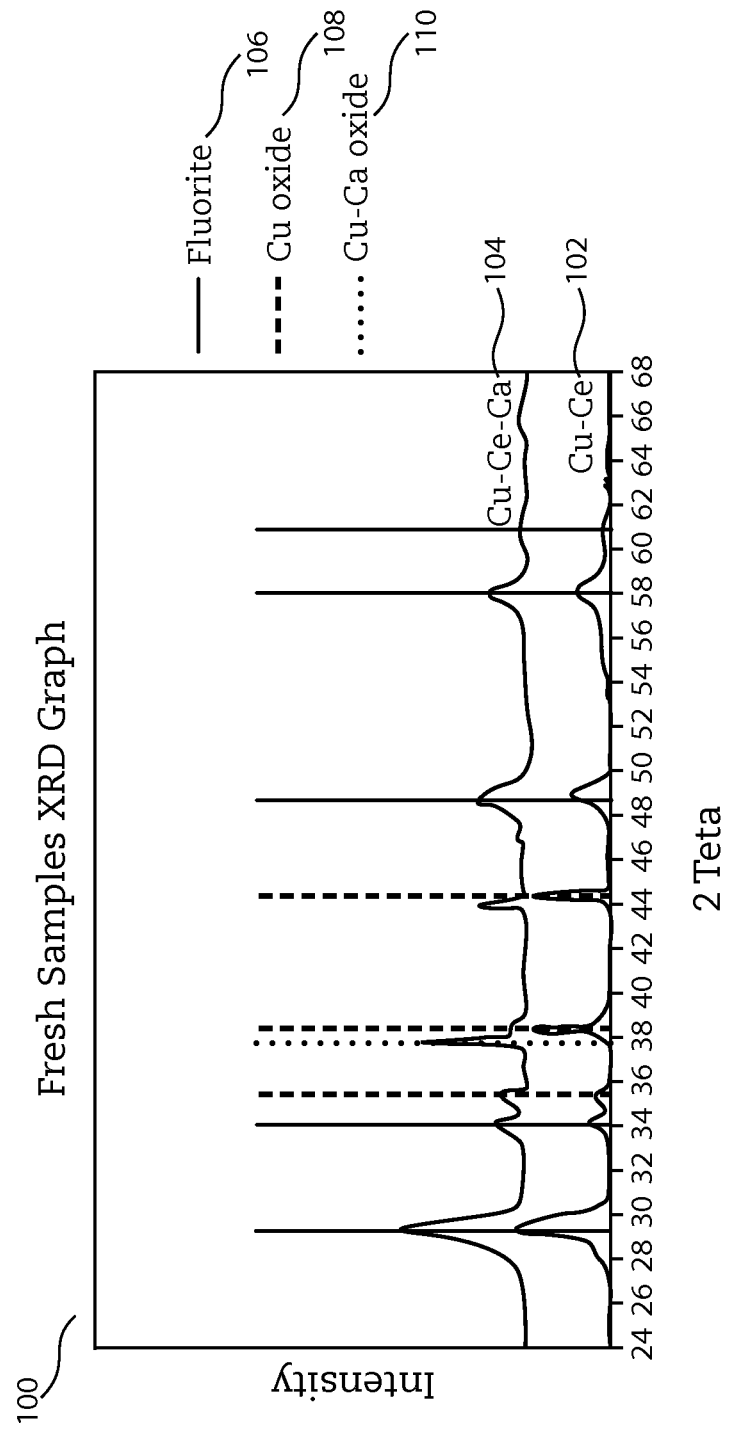
FIG. 1 is an XRD Graph for Fresh Cu—Ce/Cu—Ce—Ca Samples

Disclosed here are catalyst materials that may be of use in the conversion of exhaust gases, according to an embodiment.

The present disclosure is here described in detail with reference to embodiments illustrated in the drawings, which form a part hereof. In the drawings, which are not necessarily to scale or to proportion, similar symbols typically identify similar components, unless context dictates otherwise. Other embodiments may be used and/or other changes may be made without departing from the spirit or scope of the present disclosure. The illustrative embodiments described in the detailed description are not meant to be limiting of the subject matter presented herein.

DEFINITIONS

As used here, the following terms have the following definitions:

"Exhaust" refers to the discharge of gases, vapor, and fumes that may include hydrocarbons, nitrogen oxide, and/or carbon monoxide.

"R Value" refers to the number obtained by dividing the reducing potential by the oxidizing potential.

"Rich Exhaust" refers to exhaust with an R value above 1.

"Lean Exhaust" refers to exhaust with an R value below 1.

"Conversion" refers to the chemical alteration of at least one material into one or more other materials.

"T50" refers to the temperature at which 50% of a material is converted.

"T90" refers to the temperature at which 90% of a material is converted.

"Catalyst" refers to one or more materials that may be of use in the conversion of one or more other materials.

"Carrier material oxide" refers to support materials used for providing a surface for at least one catalyst.

"Oxygen Storage Material (OSM)" refers to a material able to take up oxygen from oxygen rich streams and able to release oxygen to oxygen deficient streams.

"Three Way Catalyst (TWC)" refers to a catalyst suitable for use in converting at least hydrocarbons, nitrogen oxide, and carbon monoxide.

"Oxidation Catalyst" refers to a catalyst suitable for use in converting at least hydrocarbons and carbon monoxide.

"Wash-coat" refers to at least one coating including at least one oxide solid that may be deposited on a substrate.

"Over-coat" refers to at least one coating that may be deposited on at least one wash-coat or impregnation layer.

"Zero Platinum Group (ZPGM) Catalyst" refers to a catalyst completely or substantially free of platinum group metals.

"Platinum Group Metals (PGMs)" refers to platinum, palladium, ruthenium, iridium, osmium, and rhodium.

DESCRIPTION OF THE DRAWINGS

A catalyst in conjunction with a sufficiently lean exhaust (containing excess oxygen) may result in the oxidation of residual HC and CO to small amounts of carbon dioxide ($CO_2$) and water ($H_2O$), where equations (1) and (2) take place.

$$2CO+O_2 \rightarrow 2CO_2 \qquad (1)$$

$$2C_mH_n+(2m+\tfrac{1}{2}n)O_2 \rightarrow 2mCO_2+nH_2O \qquad (2)$$

Although dissociation of NO into its elements may be thermodynamically favored, under practical lean conditions this may not occur. Active surfaces for NO dissociation include metallic surfaces, and dissociative adsorption of NO, equation (3), may be followed by a rapid desorption of N2, equation (4). However, oxygen atoms may remain strongly adsorbed on the catalyst surface, and soon coverage by oxygen may be complete, which may prevent further adsorption of NO, thus halting its dissociation. Effectively, the oxygen atoms under the prevailing conditions may be removed through a reaction with a reductant, for example with hydrogen, as illustrated in equation (5), or with CO as in equation (6), to provide an active surface for further NO dissociation.

$$2NO \rightarrow 2N_{ads}+2O_{ads} \qquad (3)$$

$$N_{ads}+N_{ads} \rightarrow N_2 \qquad (4)$$

$$O_{ads}+H_2 \rightarrow H_2O \qquad (5)$$

$$O_{ads}+CO \rightarrow CO_2 \qquad (6)$$

Materials that may allow one or more of these conversions to take place may include ZPGM catalysts, including catalysts containing Copper (Cu), Cerium (Ce), Tin (Sn), Niobium (Nb), Zirconium (Zr), Calcium (Ca) and combinations thereof. Catalysts containing the aforementioned metals may include any suitable Carrier Material Oxides, including Cerium Oxides, Aluminum Oxides, Titanium Oxides, doped aluminum oxide, doped ceria, fluorite, zirconium oxide, doped zirconia, titanium oxide, tin oxide, silicon dioxide, zeolite, and combinations thereof. ZPGM Catalyst may include any number of suitable OSMs, including cerium oxide, zirconium oxide, lanthanum oxide, yttrium oxide, lanthanide oxides, actinide oxides, samarium oxides, and combinations thereof. Catalysts containing the aforementioned metals, Carrier Material Oxides, and/or Oxygen Storage Materials may be suitable for use in conjunction with catalysts containing PGMs. Catalysts with the aforementioned qualities may be used in a washcoat or overcoat, in ways similar to those described in US 20100240525.

System Configuration and Composition

Figure 12:
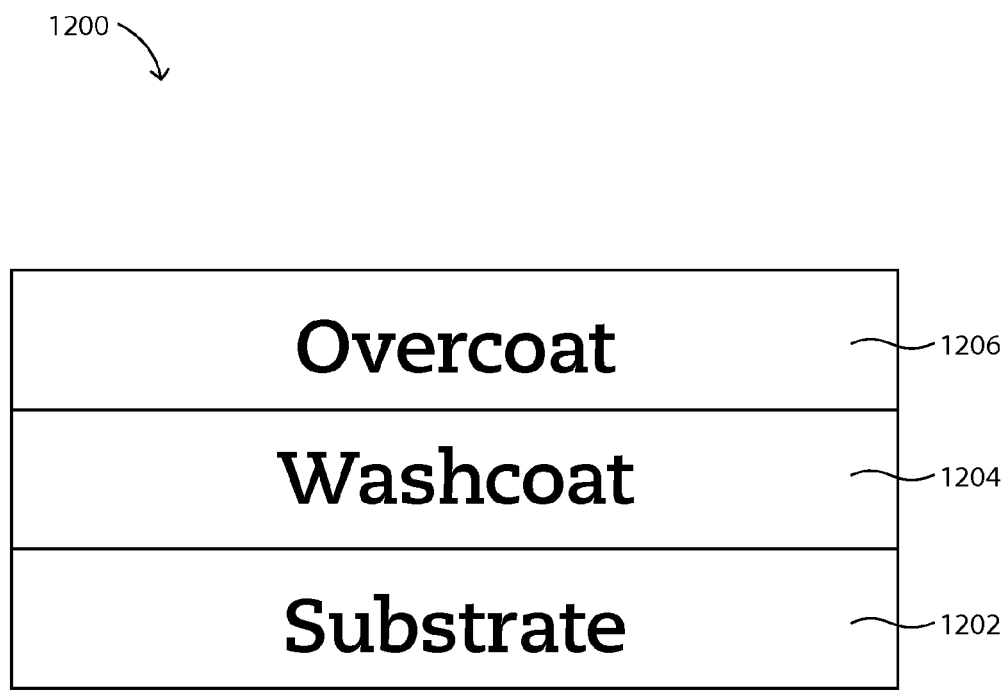
FIG. 12 shows a ZPGM catalyst system structure, according to an embodiment.

FIG. 12 depicts ZPGM Catalyst System 1200 configurations, according to various embodiments. As shown in FIG. 12 A, ZPGM Catalyst System 1200 may include at least a Substrate 1202 and a Washcoat 1204, where Washcoat 1204 may contain active two way or three way ZPGM catalyst components. ZPGM Catalyst System 1200 may optionally include an Overcoat 1206 applied on over of Washcoat 1204. Where Washcoat 1204 or Overcoat 1206, or both, may include active two way or three way ZPGM catalyst components.

According to an embodiment, Washcoat 1204 or Overcoat 1206 or both may include at least one ZPGM transition metal catalyst, a ZPGM mixed metal catalyst, a ZPGM zeolite catalyst, or combinations thereof. A ZPGM transition metal catalyst may include one or more transition metals and/or least one rare earth metal, or a mixture; excluding platinum group metals.

Preparation of a Zero Platinum Group Metal Catalyst by Impregnation

A Washcoat 1204 having may be prepared by methods well known in the art. Washcoat 1204 may comprise any of the catalysts and additional components described above. Washcoat 1204 may be deposited on a Substrate 1202 and subsequently treated. The treating may be done at a temperature between 300° C. and 700° C. In some embodiments, at about 550° C. The treatment may last from about 2 to about 6 hours. In some embodiments, the treatment may last about 4 hours. After Substrate 1202 coated with Washcoat 1204 is treated, Substrate 1202 may be cooled to about room temperature. After cooling, Washcoat 1204 may be impregnated with at least one impregnation component. The impregnation component may include, at least one transition-metal salt being dissolved in water. Following the impregnation step, ZPGM Catalyst System 1200 with the impregnation components may be heat treated. The treating may be performed from about 300° C. to about 700° C. In some embodiments, this second heat treatment may be performed at about 550° C. The treating may last from about 2 to about 6 hours, preferably about 4 hours. In an embodiment, Washcoat 1204 and the impregnation component may be treated before coating.

Preparation of a Zero Platinum Group Metal Catalyst by Precipitation

The method of precipitation includes precipitating transition metal salt or salts on Washcoat 1204. The transition metal salt or salts may be precipitated with NH4OH, (NH4)2CO3, tetraethylammonium hydroxide, other tetraalkylammonium salts, ammonium acetate, or ammonium citrate. Subsequently, the precipitated transition metal salt or salts and Washcoat 1204 may be aged. The aging may take from about 2 hours to about 24 hours. After aging, the precipitated transition metal salt or salts and Washcoat 1204 may be deposited on a Substrate 1202 followed by a heat treatment that may last from about 2 hours to about 6 hours. In an embodiment the treatment may last about 4 hours. The treatment may be performed at a temperature from about 300° C. to about 700° C. In some embodiments, the suitable temperature for the treatment may be of about 550° C. Optionally, after treatment, Overcoat 1206 may be deposited on the treated precipitated transition metal salt or salts and Washcoat 1204. Then, ZPGM Catalyst System 1200 may be heat treated. This treatment may be performed at about 300° C. to about 700° C. In some embodiments this treatment may be performed at about 550° C. The heat treatment may last from about 2 to about 6 hours. In an embodiment the treatment may last about 4 hours.

Preparation of a Zero Platinum Group Metal Catalyst by Co-Milling

In some embodiments, to prepare ZPGM catalysts, the catalysts and a carrier material oxides are milled together. The catalyst may be previously synthesized by any chemical technique such as solid-state synthesis, precipitation, or any other technique known in the art. The milled catalyst and carrier material oxide may be deposited on a Substrate 1202 in the form of a Washcoat 1204 and then treated. This treatment may be performed at about 300° C. to about 700° C. In some embodiments this treatment may be performed at about 550° C. The heat treatment may last from about 2 to about 6 hours. In an embodiment the treatment may last about 4 hours. Optionally, an Overcoat 1206 may be deposited on the treated ZPGM catalyst after cooling to about room temperature. The Overcoat 1206, Washcoat 1204 and Substrate 1202 are treated. This treatment may be performed at about 300° C. to about 700° C. In some embodiments this treatment may be performed at about 550° C. The heat treatment may last from about 2 to about 6 hours. In an embodiment the treatment may last about 4 hours. According to some embodiments, ZPGM catalyst systems 1200 including active catalysts prepared by co-milling may be able to have improved performance when compared with ZPGM catalyst systems 1200 including active catalysts prepared by other methods due to a better dispersion of the catalysts.

In other embodiments, Washcoat 1204 and Overcoat 1206 may be synthesized by any chemical techniques known in the art.

Stabilization of Catalysts

In some embodiments, the active catalysts included in ZPGM Catalyst System 1200 may need to be stabilized for enhanced effectiveness of dispersion. The stabilized metal particles may include include a transition-metal salt dissolved in a stabilizer solution. Some examples of compounds that can be used as stabilizer solutions for the transition metal ions may include polyethylene glycol, polyvinyl alcohol, poly(N-vinyl-2pyrrolidone) (PVP), polyacrylonitrile, polyacrylic acid, multilayer polyelectrolyte films, poly-siloxane, oligosaccharides, poly(4-vinylpyridine), poly(N,Ndialkylcarbodiimide), chitosan, hyper-branched aromatic polyamides and other suitable polymers. The stabilized transition metal solution may then be impregnated on Washcoat 1204, or co-milled with carrier material oxides and deposited on a Substrate 1202. After deposition a heat treament may be required. This treatment may be performed at about 300° C. to about 700° C. In some embodiments this treatment may be performed at about 550° C. The heat treatment may last from about 2 to about 6 hours. In an embodiment the treatment may last about 4 hours.

Catalyst Preparation

Catalysts similar to those described above may be prepared by co-precipitation. Co-precipitation may include the preparation of a suitable metal salt solution, where precipitate may be formed by the addition of a suitable base, including but not limited to Tetraethyl Ammonium Hydrate. This precipitate may be formed over a slurry including at least one suitable carrier material oxide, where the slurry may include any number of additional suitable Carrier Material Oxides, and may include one or more suitable Oxygen Storage Materials. The slurry may then undergo filtering and may undergo washing, where the resulting material may be dried and may later be fired. The resulting catalyst may then be subjected to an aging process.

The catalyst may also be formed on a substrate, where the substrate may be of any suitable material, including cordierite. The washcoat may include one or more carrier material oxides and may also include one or more OSMs. Cu, Ce, Sn, Nb, Zr, Ca and combinations thereof may be milled with said one or more carrier material oxides. The catalyst may then be synthesized by any suitable chemical technique, including solid-state synthesis and precipitation. The milled catalyst and carrier material oxide may then be deposited on a substrate, forming a washcoat, where the washcoat may undergo one or more heat treatments.

XRD Analysis

Figure 2:
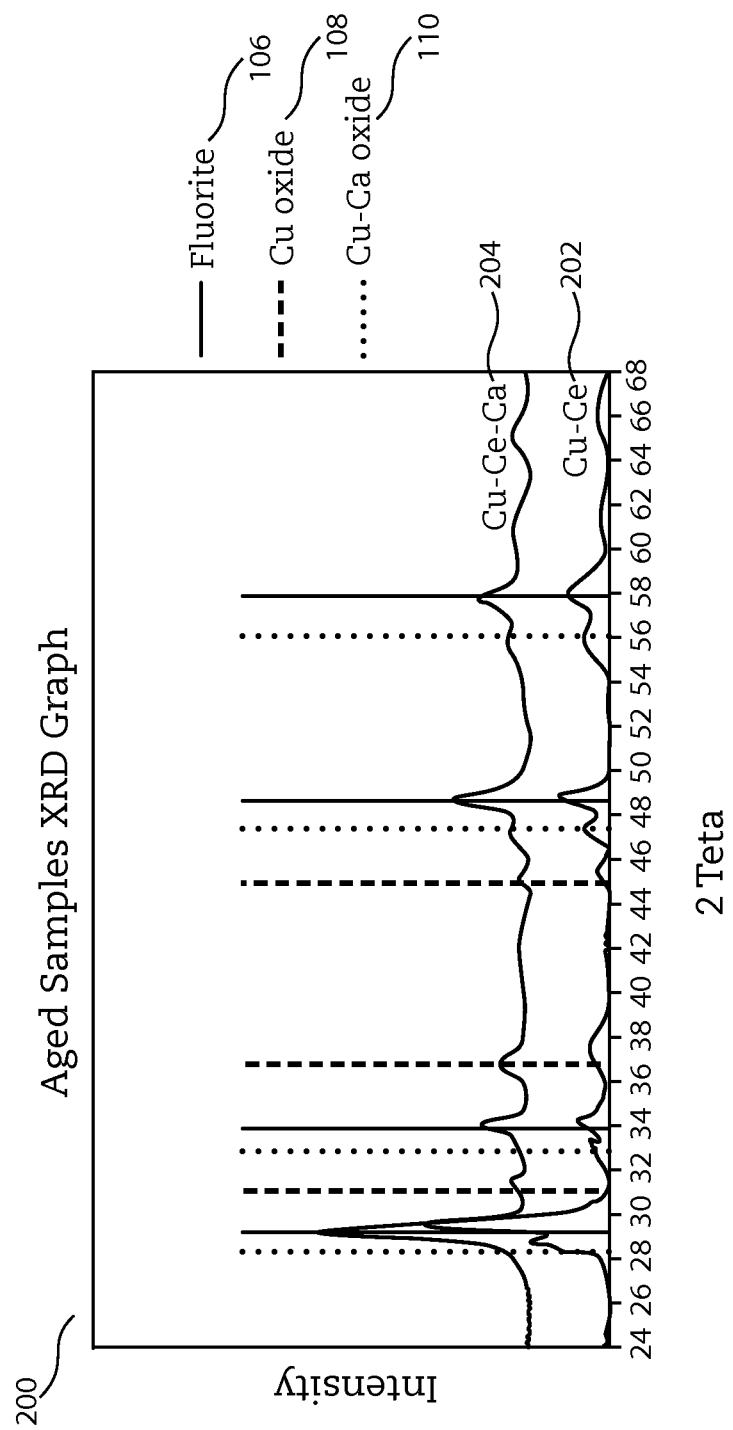
FIG. 2 is an XRD Graph for Aged Cu—Ce/Cu—Ce—Ca Samples
Figure 3:
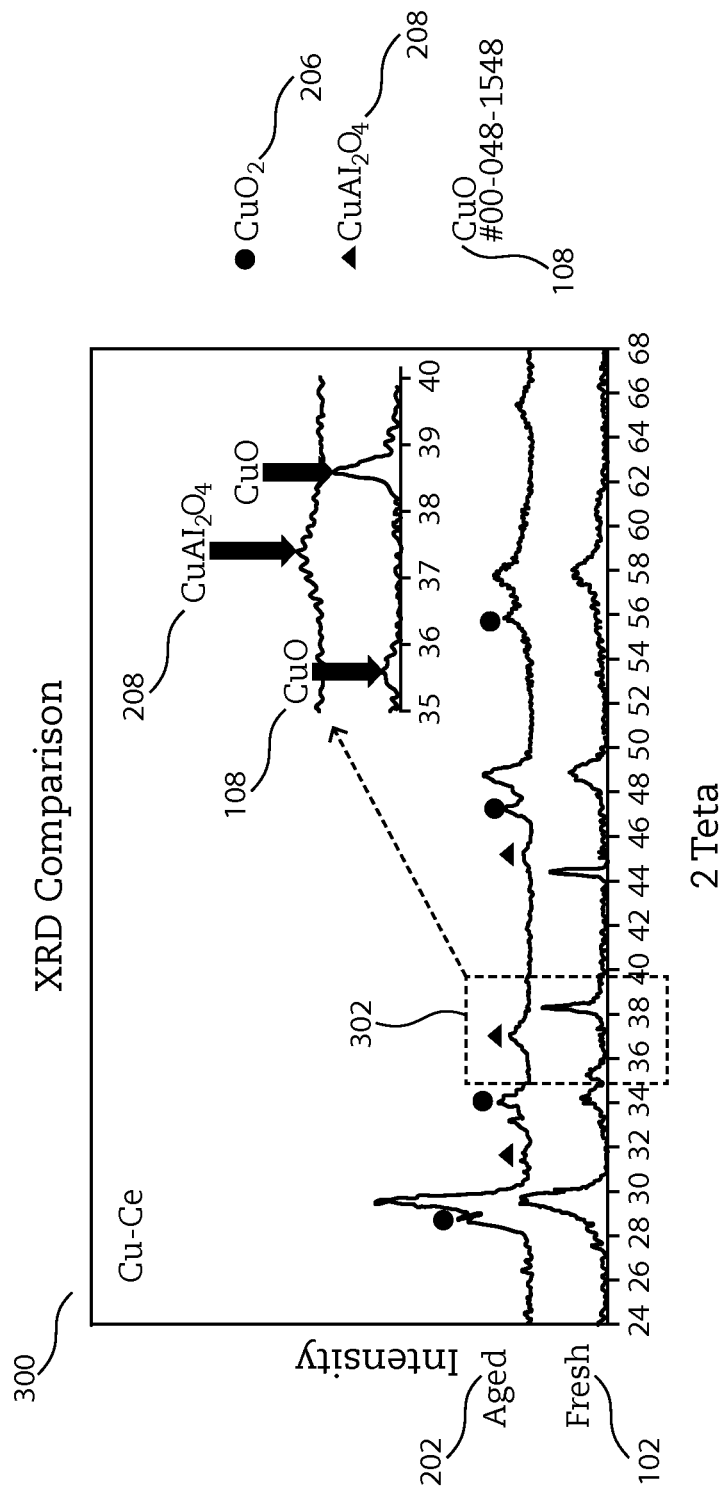
FIG. 3 is an XRD Graph Comparing Fresh and Aged Cu—Ce Samples

FIGS. 1, 2, and 3 show XRD analyses for Cu—Ce and Cu—Ce—Ca powdered samples.

FIG. 1 shows XRD Graph 100 for Cu—Ce 102 and Cu—Ce—Ca 104. XRD Graph 100 indicates the presence of Fluorite 106, CuO 108 and Cu—Ca Oxide 110 in Cu—Ce 102 and Cu—Ce—Ca 104.

FIG. 2 shows XRD Graph 200 for Cu—Ce 202 and Cu—Ce—Ca 204. XRD Graph 200 indicates the presence of Fluorite 106, CeO2 206 and CuAl2O4 208 in Cu—Ce 202 and Cu—Ce—Ca 204.

FIG. 3 shows XRD Graph 300, having Cu—Ce 102, Cu—Ce 202, CuO 108, CuAl2O4 208, and CeO2 206. Focus Area 302 shows the formation of CuAl2O4 208 and the absence of CuO 108 in Cu—Ce 202.

From FIGS. 1, 2, and 3 it may be seen that the aging process causes the transition of Cu2+ from oxide structure (CuO) to spinel structure (CuAl2O4 208). Cu—Ce 202 and Cu—Ce—Ca 204 also exhibit sintering of Fluorite 106 because of the presence of sharper peak of flourite after aging.

Figure 4:
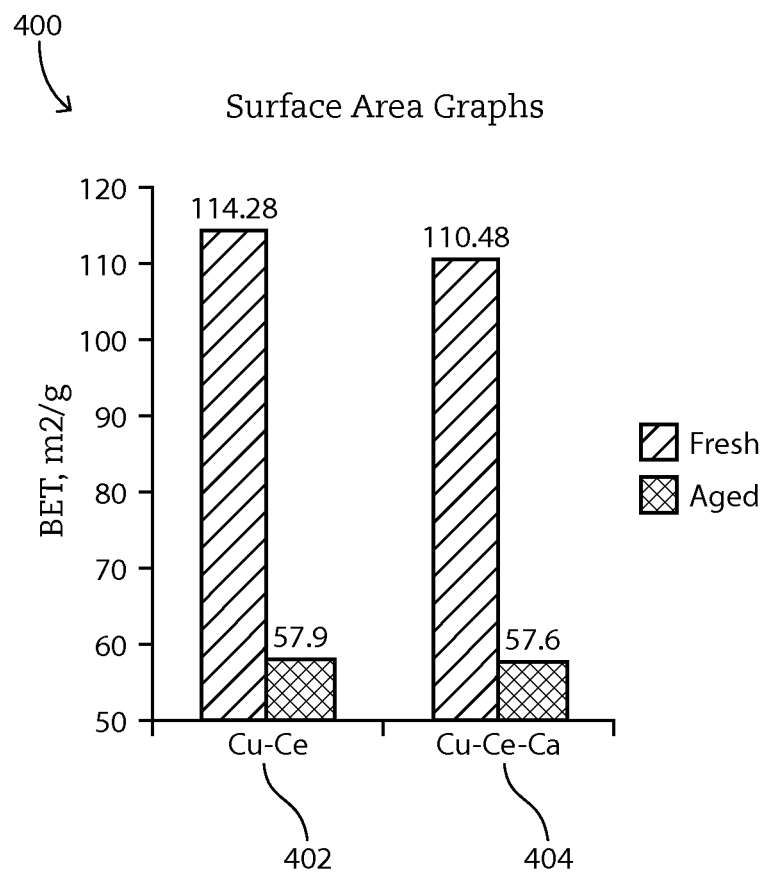
FIG. 4 is a BET Surface Area Graph for Cu—Ce and Cu—Ce—Ca

FIG. 4 shows Surface Area Graphs 400, for Cu—Ce 402 and Cu—Ce—Ca 404. The graph indicates that the BET surface area of fresh Cu—Ce 402 and Cu—Ce—Ca 404 may vary by a factor of less than 10%, and after aging the surface area may vary by a comparatively smaller factor.

Figure 5:
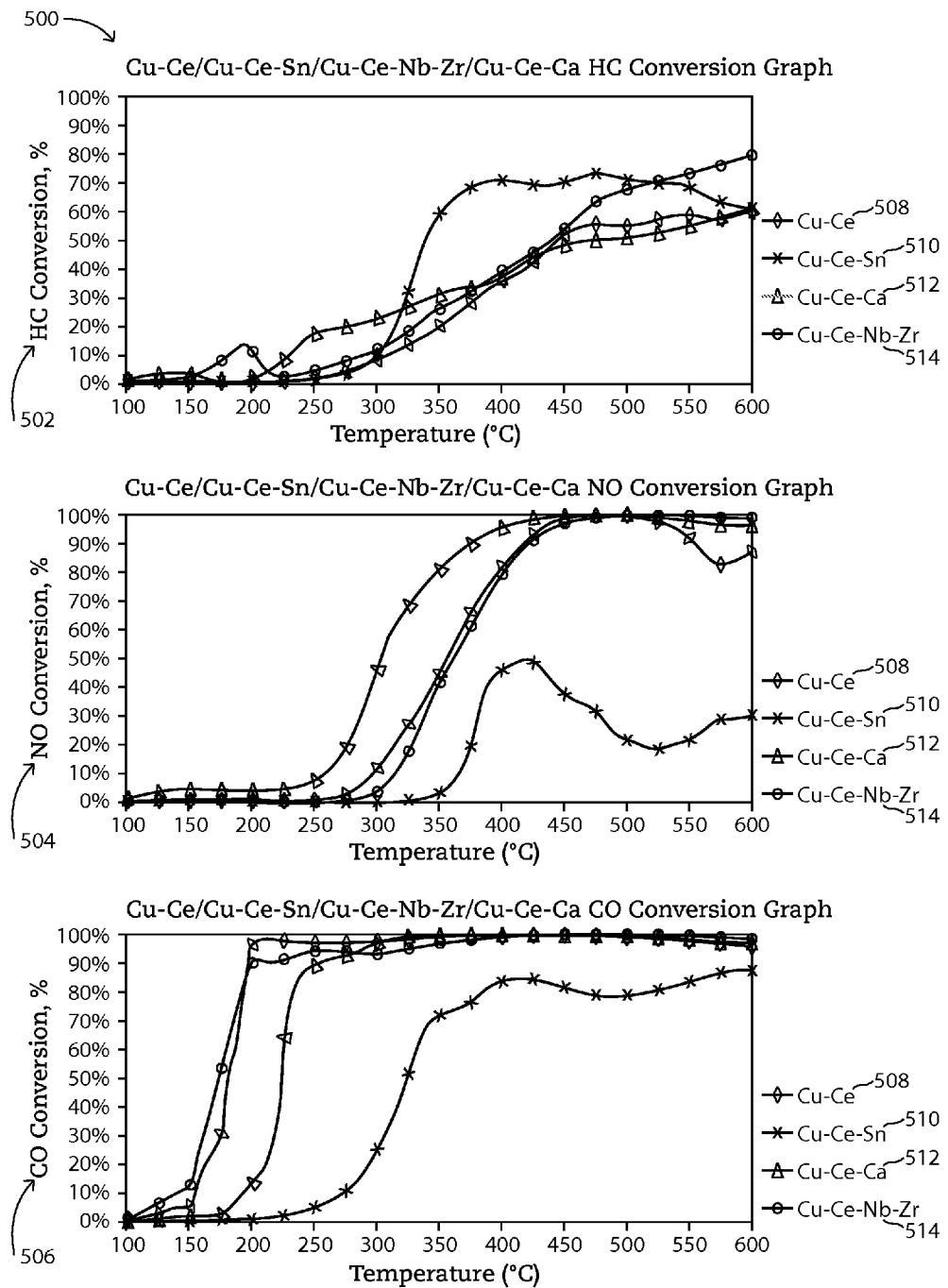
FIG. 5 is a series of HC, NO, and CO Conversion Graphs for Cu—Ce, Cu—Ce—Sn, Cu—Ce—Nb—Zr, and Cu—Ce—Ca.

FIG. 5 shows Conversion Graphs 500, including HC Conversion Graph 502, NO Conversion Graph 504, and CO Conversion Graph 506 for Cu—Ce 508, Cu—Ce—Sn 510, Cu—Ce—Ca 512 and Cu—Ce—Nb—Zr 514. These graphs illustrate the behavior of fresh Cu—Ce 508, Cu—Ce—Sn 510, Cu—Ce—Ca 512 and Cu—Ce—Nb—Zr 514 in a rich exhaust environment.

From HC Conversion Graph 502, it may be noted that compared to Cu—Ce 508, Cu—Ce—Sn 510 seems to show a higher HC conversion rate in the range of about 325-500° C., Cu—Ce—Ca 512 seems to show a higher HC conversion rate in the temperature range of about 225-325° C., and Cu—Ce—Nb—Zr 514 seems to have a higher HC conversion rate in the temperature range of about 150-225° C. and higher temperature than 450 C.

From NO Conversion Graph 504, it may be noted that compared to Cu—Ce 508, Cu—Ce—Sn 510 seems to show a notably poorer NO conversion rate throughout the tested temperature range, Cu—Ce—Ca 512 seems to show a higher NO conversion rate throughout the tested temperature range, and Cu—Ce—Nb—Zr 514 seems to have a very similar NO conversion rate in the tested temperature range.

From CO Conversion Graph 506, it may be noted that compared to Cu—Ce 508, Cu—Ce—Sn 510 seems to show a poorer CO conversion rate throughout the tested temperature range, Cu—Ce—Ca 512 seems to show a lower CO conversion rate in the temperature range of about 150-250° C., and Cu—Ce—Nb—Zr 514 seems to have a similar CO conversion rate throughout the tested temperature range.

Figure 6:
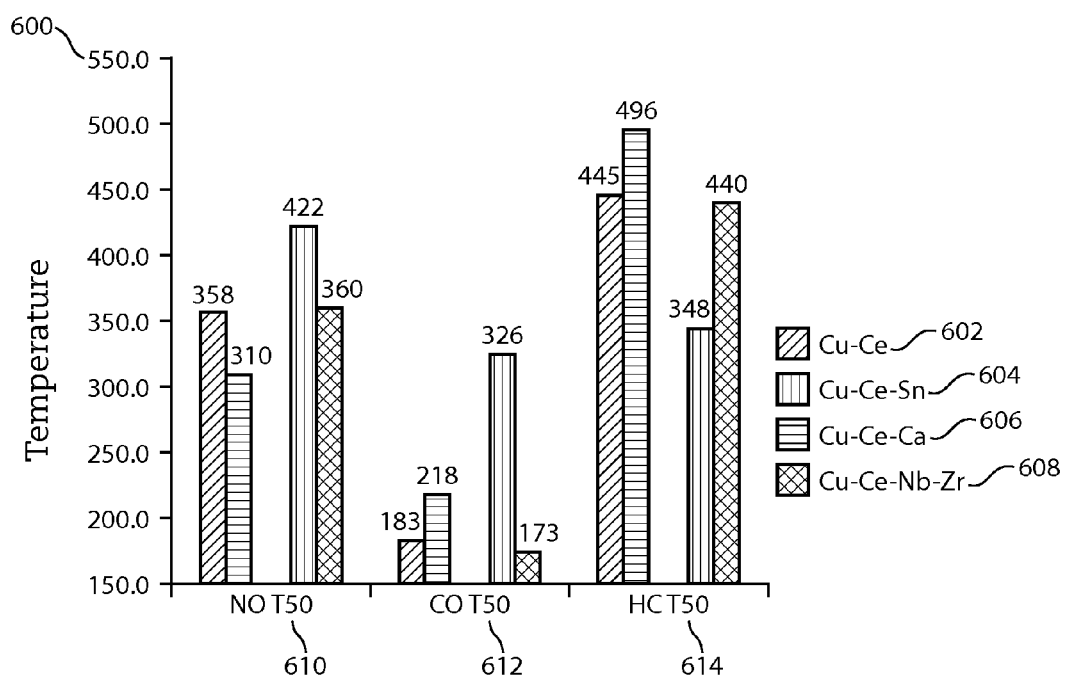
FIG. 6 is a series of NO, CO, and HC T50 Conversion graphs for Cu—Ce, Cu—Ce—Sn, Cu—Ce—Ca, and Cu—Ce—Nb—Zr.

FIG. 6 shows T50 Conversion Graph 600 for fresh powdered Cu—Ce 602, Cu—Ce—Sn 604, Cu—Ce—Ca 606 and Cu—Ce—Nb—Zr 608, where NO T50 610, CO T50 612, and HC T50 614 are illustrated. The powders may be similar to those described in FIG. 5.

Note that in T50 Conversion Graph 600, compared to Cu—Ce 602, Cu—Ce—Sn 604 has a higher NO T50 610 conversion temperature, CO T50 612 conversion temperature, but a lower HC T50 614 conversion temperature. Compared to Cu—Ce 602, Cu—Ce—Ca 606 has a lower NO T50

610 conversion temperature, higher CO T50 612 conversion temperature, and higher HC T50 614 conversion temperature. Compared to Cu—Ce 602, Cu—Ce—Nb—Zr 608 has a similar NO T50 610 conversion temperature, lower CO T50 612 conversion temperature, and similar HC T50 614 conversion temperature.

Figure 7:
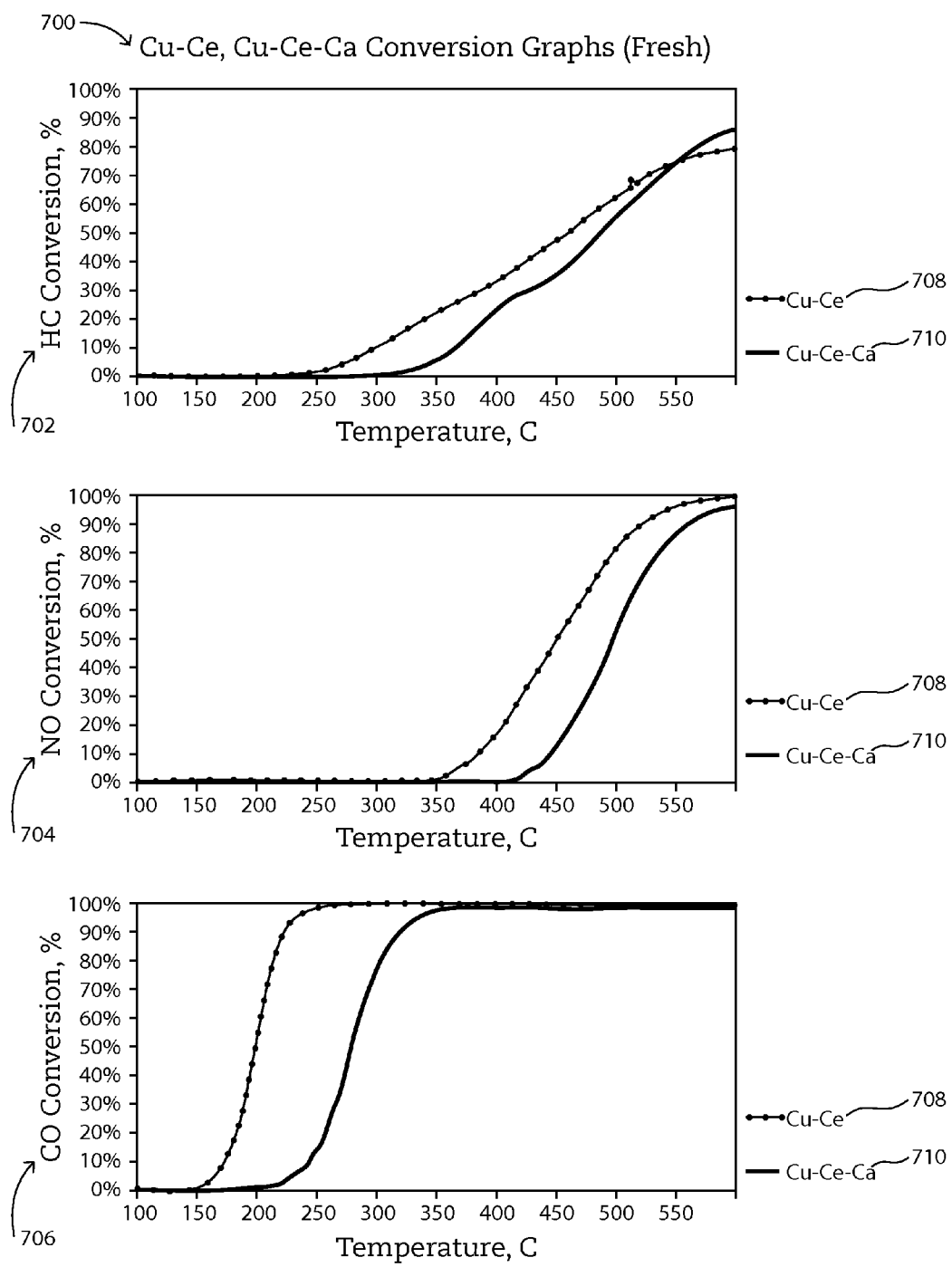
FIG. 7 is a series of HC, NO, and CO conversion graphs for fresh Cu—Ce and Cu—Ce—Ca catalysts.

FIG. 7 shows Conversion Graphs 700, including HC Conversion Graph 702, NO Conversion Graph 704, and CO Conversion Graph 706 for Fresh Cu—Ce 708 and Fresh Cu—Ce—Ca 710, where Fresh Cu—Ce 708 and Fresh Cu—Ce—Ca 710 have been applied in a washcoat. The light-off curves were obtained under a rich exhaust condition. In HC Conversion Graph 702, Fresh Cu—Ce 708 seems to exhibit a higher HC conversion rate compared to Fresh Cu—Ce—Ca 710 at temperatures below about 500° C. In NO Conversion Graph 704, Fresh Cu—Ce—Ca 710 seems to exhibit a lower NO conversion rate in the tested temperature range when compared to Fresh Cu—Ce 708. In CO Conversion Graph 706, when compared to Fresh Cu—Ce 708, Fresh Cu—Ce—Ca 710 seems to exhibit a lower CO conversion rate in the temperature range of about 150-350° C.

Figure 8:
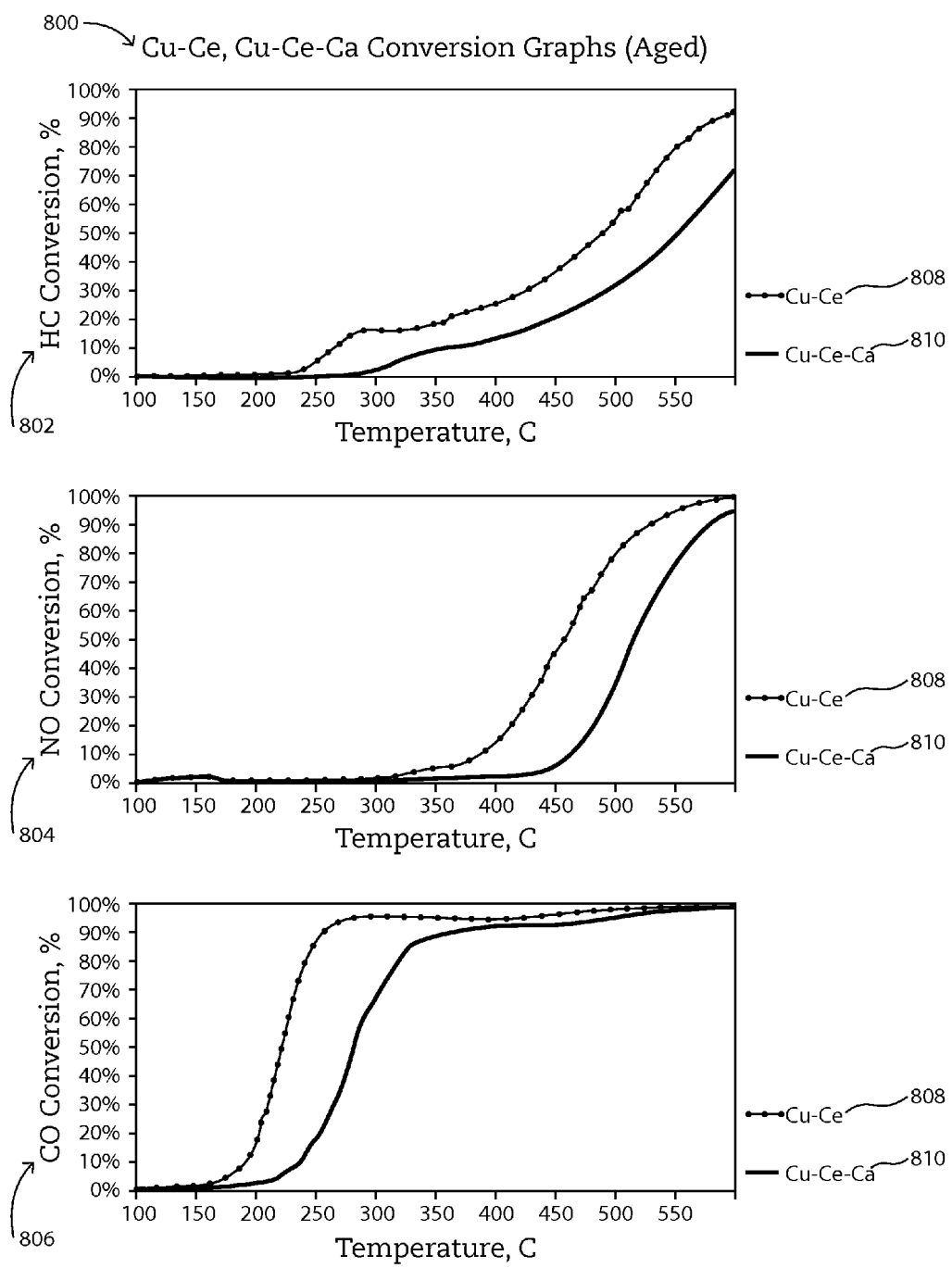
FIG. 8 is a series of HC, NO, and CO conversion graphs for aged Cu—Ce and Cu—Ce—Ca catalysts.

FIG. 8 shows Conversion Graphs 800, including HC Conversion Graph 802, NO Conversion Graph 804, and CO Conversion Graph 806 for Aged Cu—Ce 808 and Aged Cu—Ce—Ca 810, where Aged Cu—Ce 808 and Aged Cu—Ce—Ca 810 have been applied in a washcoat. The light-off curves were obtained under a rich exhaust condition, and samples were aged at 900 C for 4 hours under dry air. Note that in HC Conversion Graph 802, NO Conversion Graph 804, and CO Conversion Graph 806 Aged Cu—Ce 808 seems to have a higher conversion rate than Aged Cu—Ce—Ca 810 throughout the temperature range tested.

Figure 9:
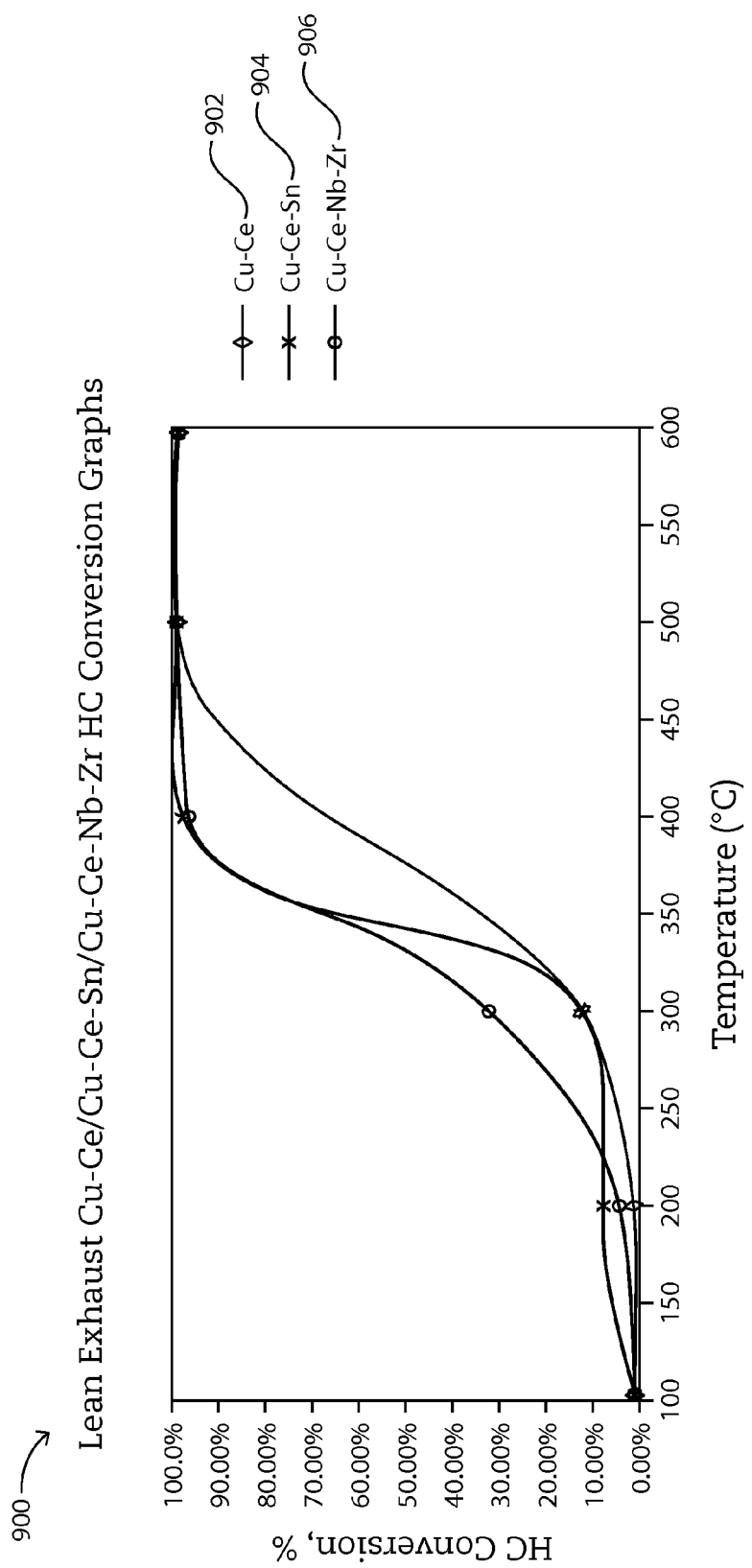
FIG. 9 is a HC conversion graph for Cu—Ce, Cu—Ce—Sn, and Cu—Ce—Nb—Zr in a lean exhaust.

FIG. 9 shows HC Conversion Graph 900 for Cu—Ce 902, Cu—Ce—Sn 904, and Cu—Ce—Nb—Zr 906 in a lean exhaust. Note that when compared to Cu—Ce 902, both Cu—Ce—Sn 904 and Cu—Ce—Nb—Zr 906 seem to have a higher conversion rate in the temperature range of about 100-500° C.

Figure 10:
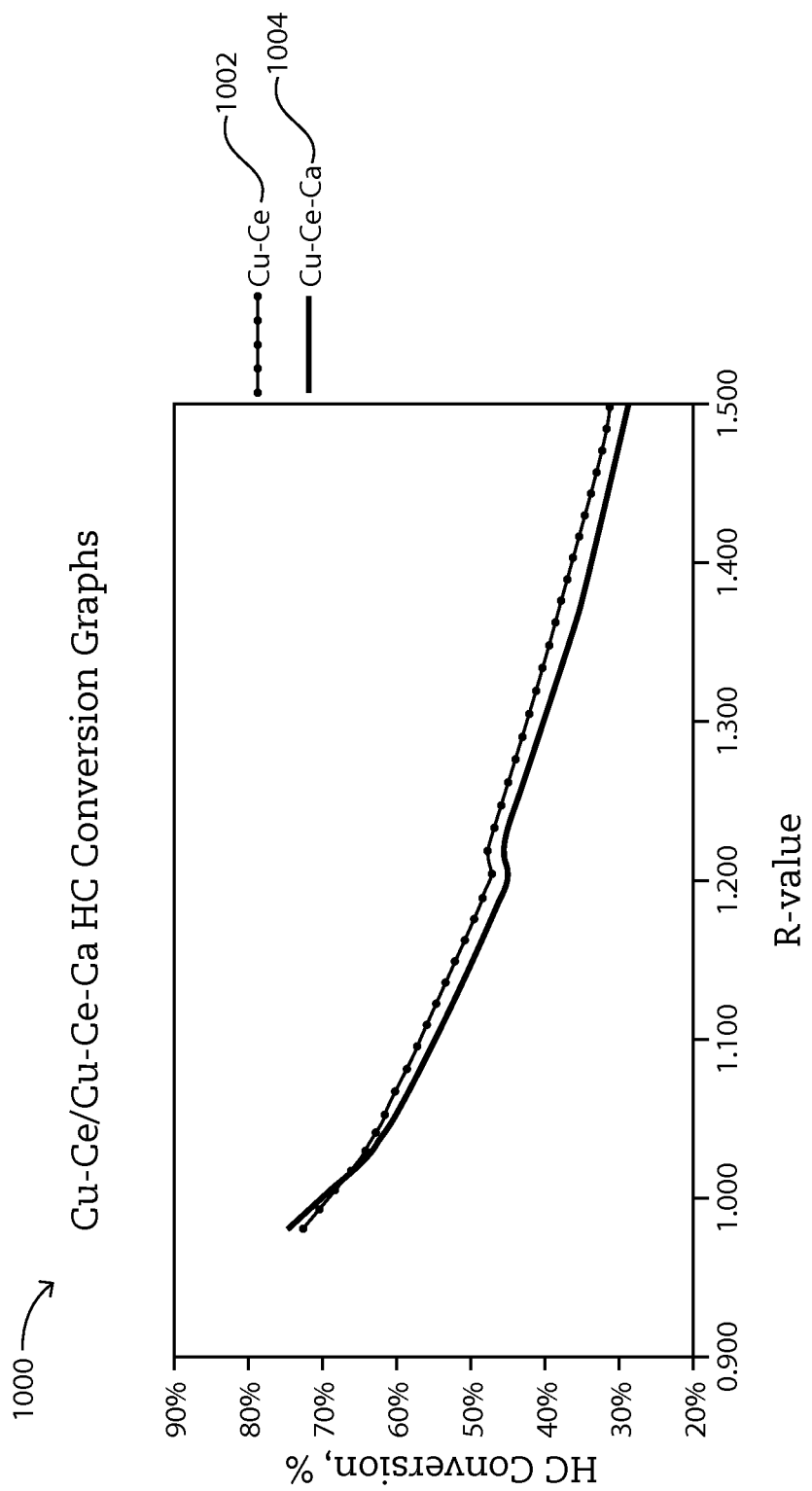
FIG. 10 is a HC Conversion versus Richness Graph for Cu—Ce and Cu—Ce—Ca.

FIG. 10 shows HC Conversion vs Richness Graph 1000 for Cu—Ce 1002 and Cu—Ce—Ca 1004 at a temperature of 400° C., where when compared to Cu—Ce 1002, Cu—Ce—Ca 1004 appears to have a higher HC conversion rate as the richness of the exhaust approaches stoichiometric condition (R=1).

Figure 11:
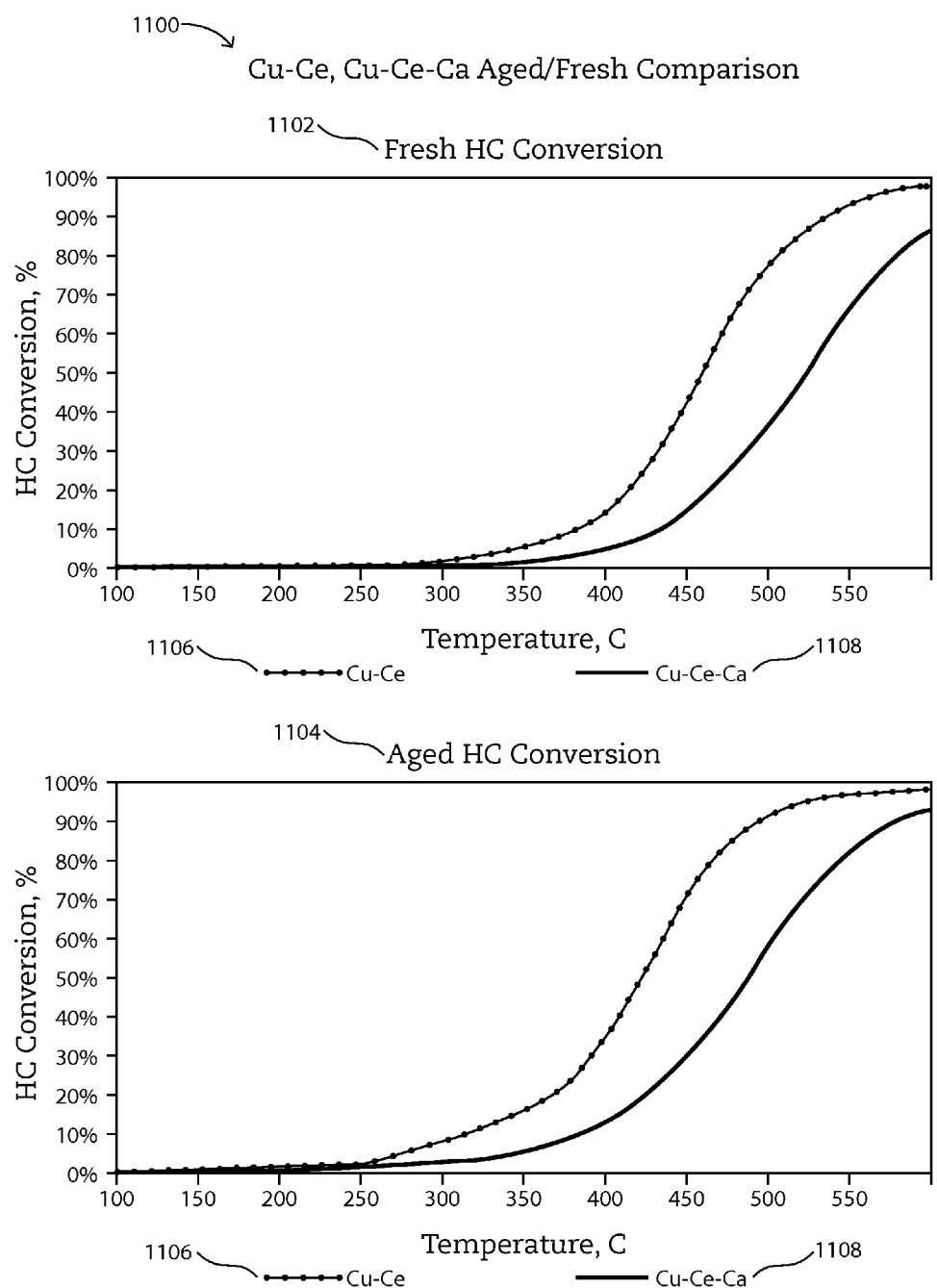
FIG. 11 is a HC Conversion Graph comparing Fresh and Aged Cu—Ce and Cu—Ce—Ca samples.

FIG. 11 shows HC Conversion Graphs 1100, including Fresh HC Conversion Graph 1102 and Aged HC Conversion Graph 1104 for Cu—Ce 1106 and Cu—Ce—Ca 1108 in a feed including $C_3H_6+O_2+CO_2+H_2O$, where only HC are reacted. In both Fresh HC Conversion Graph 1102 and Aged HC Conversion Graph 1104, Cu—Ce 1106 seems to have a higher conversion rate than Cu—Ce—Ca 1108 in the temperature range tested.

EXAMPLES

Example 1

A Catalyst containing 5-15 wt % Cu, 5-15 wt % Ce is prepared by co-precipitating metal salt solutions over a slurry containing Al2O3 as the carrier material oxide and Ce—Zr—Nd—Pr as an OSM, where the Carrier Material Oxide to OSM ratio is 60:40 by weight. The co-precipitation is done using Tetraethyl Ammonium Hydrate at around neutral pH. The slurry is then filtered and washed twice, where the cake is then dried at 120° C. for 6 or more hours, and is then fired at 550° C. for 4 hours.

A Catalyst containing 10 wt % Cu-12 wt % Ce is formed by co-precipitating a copper salt and cerium salt solution. The co-precipitation is carried out by adjusting the PH of the solution to 6.5-7 using tetraethyl ammonium hydrate, and the resulting slurry is filtered and washed twice. A cake is formed, which is dried in a 120° C. environment and is later fired for 4 hours in a 550° C. environment.

The resulting Fresh Cu—Ce catalyst has a behavior similar to that described by FIGS. 1, 2, 3, 4, 5, 6

Example 2

A Catalyst containing 5-15 wt % Cu, 5-15 wt % Ce, 5-15 wt % Ca is prepared by co-precipitating metal salt solutions over a slurry containing Al2O3 as the carrier material oxide and Ce—Zr—Nd—Pr as an OSM, where the Carrier Material Oxide to OSM ratio is 60:40 by weight. The co-precipitation is done using Tetraethyl Ammonium Hydrate at around neutral pH. The slurry is then filtered and washed twice, where the cake is then dried at 120° C. for 6 or more hours, and is then fired at 550° C. for 4 hours.

A Catalyst containing 10 wt % Cu-12 wt % Ce-5 wt % Ca is formed by co-precipitating a copper salt, cerium salt and calcium salt solution. The co-precipitation is carried out by adjusting the PH of the solution to 6.5-7 using tetraethyl ammonium hydrate, and the resulting slurry is filtered and washed twice. A cake is formed, which is dried in a 120° C. environment and is later fired for 4 hours in a 550° C. environment. The cake is then aged in dry air at 900 for 4 hours.

The resulting Aged Cu—Ce—Ca catalyst has a behavior similar to that described by FIGS. 1, 2, 3, 4, 5, 6.

Example 3

A Catalyst containing 5-15 wt % Cu, 5-15 wt % Ce, 3-12 wt % Nb, 10-20 wt % Zr is prepared by co-precipitating metal salt solutions over a slurry containing Al2O3 as the carrier material oxide and Ce—Zr—Nd—Pr as an OSM, where the Carrier Material Oxide to OSM ratio is 60:40 by weight. The co-precipitation is done using Tetraethyl Ammonium Hydrate at around neutral pH. The slurry is then filtered and washed twice, where the cake is then dried at 120° C. for 6 or more hours, and is then fired at 550° C. for 4 hours.

The resulting fresh Cu—Ce—Nb—Zr has a behavior similar to that described by FIGS. 4,5,6.

Example 4

A Catalyst containing 5-15 wt % Cu, 5-15 wt % Ce, 1-10 wt % Sn is prepared by co-precipitating metal salt solutions over a slurry containing Al2O3 as the carrier material oxide and Ce—Zr—Nd—Pr as an OSM, where the Carrier Material Oxide to OSM ratio is 60:40 by weight. The co-precipitation is done using Tetraethyl Ammonium Hydrate at around neutral pH. The slurry is then filtered and washed twice, where the cake is then dried at 120° C. for 6 or more hours, and is then fired at 550° C. for 4 hours.

The resulting fresh Cu—Ce—Sn has a behavior similar to that described by FIGS. 4,5,6.

Example 5

A catalyst is to be formed on a substrate using a washcoat. The substrate includes cordierite structures. The washcoat includes alumina and at least one suitable oxygen storage material, including mixtures of cerium and zirconium. The oxygen storage material and the alumina may be present in the washcoat in a ratio of 40 to about 60 by weight. Cu, Ce, and a carrier material oxide are milled together. The catalyst can be synthesized by any chemical technique such as, but not limited to solid-state synthesis, precipitation, or any other technique known in the art. The milled catalyst and carrier material oxide are deposited on a substrate in the form of a washcoat and then heat treated. The heat treating is done at a suitable temperature, including temperatures between 300° C. and 700° C. In one or more embodiments, the heat treatment is done at 550° C. The heat treating may last from about 2 to about 6 hours, lasting about 4 hours in one or more embodiments. Cu and Ce in the washcoat are present in about 1 wt % to about 15 wt %, in some embodiments being present from about 4 wt % to about 10 wt %.

The Cu—Ce catalyst formed has a behavior similar to that described by FIGS. 7,8,9,10,11

Example 6

A catalyst is to be formed on a substrate using a washcoat. The substrate is includes cordierite structures. The washcoat includes alumina and at least one suitable oxygen storage material, including mixtures of cerium and zirconium. The oxygen storage material and the alumina may be present in the washcoat in a ratio of 40 to about 60 by weight. Cu, Ca, and a carrier material oxide are milled together. The catalyst can be synthesized by any chemical technique such as, but not limited to solid-state synthesis, precipitation, or any other technique known in the art. The milled catalyst and carrier material oxide are deposited on a substrate in the form of a washcoat and then heat treated. The heat treating is done at a suitable temperature, including temperatures between 300° C. and 700° C. In one or more embodiments, the heat treatment is done at 550° C. The heat treating may last from about 2 to about 6 hours, lasting about 4 hours in one or more embodiments. Cu, Ce, and Ca in the washcoat are present in about 1 wt % to about 15 wt %, in some embodiments being present from about 4 wt % to about 10 wt %.

The Cu—Ce—Ca catalyst formed has a behavior similar to that described by FIGS. 7,8,9,10,11

What I claim:

1. An apparatus for reducing emissions from an engine having associated therewith an exhaust system, the apparatus providing a reaction effective for catalytic conversion of hydrocarbons, nitrogen oxides and carbon monoxide from an exhaust source, the apparatus comprising:
    a catalyst system, comprising:
        a substrate;
        a catalyst;
        a washcoat suitable for deposition on the substrate; and
        an overcoat suitable for deposition on the substrate or the washcoat;
    wherein the catalyst comprises about 5% to about 15% by weight of copper, about 5% to about 15% by weight of cerium, and about 5% to about 15% by weight of one selected from the group consisting at least one of calcium, niobium, zirconium, and tin; and
    wherein the catalyst is suitable for deposition on a coat selected from the group consisting of at least one of the washcoat and the overcoat.

2. The apparatus of claim 1, wherein the washcoat is suitable for deposition on the substrate, comprising at least one oxide solid selected from the group consisting of at least one of a carrier metal oxide, and a catalyst.

3. The apparatus of claim 1, wherein the overcoat is suitable for deposition on the substrate, comprising: at least one overcoat oxide solid selected from the group consisting of at least one of a carrier material oxide, and a catalyst, and at least one oxygen storage material.

4. The apparatus of claim 1, wherein the catalyst is prepared by a method selected from the group consisting of co-milling, co-precipitation, impregnation, and stabilization.

5. The apparatus of claim 1, wherein the catalyst comprises about 10% by weight of copper and 12% by weight of cerium.

6. The apparatus of claim 1, wherein the catalyst system oxidizes a plurality of the hydrocarbons and carbon monoxide.

7. The apparatus of claim 1, wherein the catalyst system oxidizes a plurality of the hydrocarbons.

8. The apparatus of claim 1, wherein the T50 conversion temperature for the hydrocarbons is less than 450 degrees Celsius.

9. The apparatus of claim 1, wherein the T50 conversion temperature for nitrogen oxide is about 350 degrees Celsius.

10. The apparatus of claim 1, wherein the T50 conversion temperature for the carbon monoxide is less than 200 degrees Celsius.

11. The apparatus of claim 1, wherein the carrier metal oxide is selected from the group consisting of at least one of $Al_2O_3$, $CeO_2$, $ZrO_2$, and $TiO_2$.

12. The apparatus of claim 11, wherein the catalyst is deposited on the carrier metal oxide.

13. The apparatus of claim 1, wherein the oxygen storage material is selected from the group consisting of at least one of cerium, zirconium, neodymium, praseodymium, samarium, lanthanum, and yttrium.

14. The apparatus of claim 1, wherein the washcoat further comprises at least one oxygen storage material.

15. The apparatus of claim 1, wherein the catalyst oxidizes at least one of the hydrocarbons, the nitrogen oxide, and the carbon monoxide.

16. The apparatus of claim 1, wherein the catalyst system oxidizes at least one of the hydrocarbons and the carbon monoxide.

* * * * *